US012296588B2

(12) United States Patent
Tamenaga

(10) Patent No.: US 12,296,588 B2
(45) Date of Patent: May 13, 2025

(54) LIQUID EJECTION HEAD AND MANUFACTURING METHOD FOR LIQUID EJECTION HEAD

(71) Applicant: CANON KABUSHIKI KAISHA, Tokyo (JP)

(72) Inventor: Zentaro Tamenaga, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 82 days.

(21) Appl. No.: 17/938,006

(22) Filed: Oct. 4, 2022

(65) Prior Publication Data

US 2023/0109029 A1 Apr. 6, 2023

(30) Foreign Application Priority Data

Oct. 5, 2021 (JP) ................................ 2021-164257

(51) Int. Cl.
*B41J 2/14* (2006.01)
*B41J 2/16* (2006.01)

(52) U.S. Cl.
CPC ......... *B41J 2/14201* (2013.01); *B41J 2/1607* (2013.01); *B41J 2/1623* (2013.01); *B41J 2002/14491* (2013.01)

(58) Field of Classification Search
CPC .... B41J 2/14201; B41J 2/1607; B41J 2/1623; B41J 2002/14491; B41J 2/14072; B41J 2/1603
See application file for complete search history.

(56) References Cited

U.S. PATENT DOCUMENTS 9,950,511 B2 4/2018 Dodd et al.
2020/0331271 A1* 10/2020 Takahashi .............. H01L 24/92

* cited by examiner

*Primary Examiner* — Lisa Solomon
(74) *Attorney, Agent, or Firm* — Canon U.S.A., Inc. I.P. Division

(57) ABSTRACT

A liquid ejection head includes a recording element substrate and an electric wiring substrate. The recording element substrate includes an ejection port configured to eject liquid, an energy generating element configured to generate energy for ejecting the liquid from the ejection port, and an electrode terminal that is electrically connected to the energy generating element. The electric wiring substrate is electrically connected to the electrode terminal by using wire bonding or the like. The electrode terminal is disposed on a connection surface of the recording element substrate, and a connection region in which electric connection to the electrode terminal is established is arranged at an end portion of the electric wiring substrate. The end portion of the electric wiring substrate is disposed above the surface of the recording element substrate on the connection surface side and is separated from the electrode terminal.

12 Claims, 8 Drawing Sheets

LIQUID EJECTION HEAD AND MANUFACTURING METHOD FOR LIQUID EJECTION HEAD

BACKGROUND

Field of the Disclosure

The present disclosure relates to a liquid ejection head and a manufacturing method for the liquid ejection head.

Description of the Related Art

A liquid ejection head represented by an ink-jet recording head is provided with a recording element substrate including an ejection port that ejects liquid, an energy generating element that generates energy for ejecting the liquid from the ejection port, and an electrode terminal electrically connected to the energy generating element. In order to supply power and signals from the main body of a liquid ejection apparatus including the liquid ejection head to the recording element substrate, an electric wiring substrate is used. Examples of the electric wiring substrate include a flexible printed circuit (FPC) substrate, and a tape automated bonding (TAB) substrate. U.S. Pat. No. 9,950,511 discusses a liquid ejection head in which an electric wiring substrate and an electrode terminal of a recording element substrate are electrically connected to each other by using wire bonding, and an electric connection portion therebetween are furthermore protected with a sealing agent.

When the wire bonding is performed, heat, pressure, ultrasonic waves, or/and the like is/are applied at a connecting position, and therefore it is necessary to support members to be connected. In the liquid ejection head discussed in U.S. Pat. No. 9,950,511, there is no member that supports the electric wiring substrate, and thus it is necessary to support the electric wiring substrate with a jig when the wire bonding is performed. When the jig is used, there may be a case where a step, which is formed due to a thickness tolerance, prevents stable support of the electric wiring substrate, and thereby damages reliability of the electric connection portion.

SUMMARY

The present disclosure provides examples of a liquid ejection head that secures reliability in an electric connection portion between a recording element substrate and an electric wiring substrate, and a manufacturing method for the liquid ejection head.

According to an aspect of the present disclosure, a liquid ejection head includes a recording element substrate and an electric wiring substrate. The recording element substrate includes an ejection port configured to eject liquid, an energy generating element configured to generate energy for ejecting the liquid from the ejection port, and an electrode terminal that is electrically connected to the energy generating element. The electric wiring substrate is electrically connected to the electrode terminal. The electrode terminal is disposed on a connection surface of the recording element substrate, and a connection region, in which electric connection to the electrode terminal is established, is arranged at an end portion of the electric wiring substrate. The end portion of the electric wiring substrate is disposed above the surface of the recording element substrate on a connection surface side and is separated from the electrode terminal.

Further features of the present disclosure will become apparent from the following description of exemplary embodiments with reference to the attached drawings.

DESCRIPTION OF THE EMBODIMENTS

Exemplary embodiments to which the present disclosure can be applied will be described with reference to the accompanying drawings. A liquid ejection head according to the present disclosure includes at least a recording element substrate and an electric wiring substrate.

The recording element substrate includes an ejection port that ejects liquid, an energy generating element that generates energy for ejecting liquid from the ejection port, and an electrode terminal that is electrically connected to the energy generating element. The electric wiring substrate is electrically connected to the electrode terminal of the recording element substrate. While some exemplary embodiments regarding the liquid ejection head according to the present disclosure will be described below, these exemplary embodiments do not limit the scope of the present disclosure.

As one example, a description will be given of a thermal system liquid ejection head that applies heat to liquid using an electro-thermal converter as an energy generating element to generate air bubbles, and thereby ejects the liquid from an ejection port. However, the present disclosure can be applied to a liquid ejection head of a system other than the thermal system. Especially, the present disclosure can be used for a piezoelectric system liquid ejection head using a piezoelectric element as the energy generating element. In the piezoelectric system liquid ejection head, flow channels corresponding to the number of ejection ports that eject liquid droplets are individually arranged, and the piezoelectric element that generates pressure for ejection is attached to each of the individual flow channels. To arrange the ejection ports in high density without changing dimensions of the recording element substrate or the like, it is necessary to increase the number of piezoelectric elements, and the number of electrode terminals increases accordingly. To arrange the electrode terminals within a limited region, it is necessary to narrow a pitch between the electrode terminals. According to the present disclosure, even when the pitch between the electrode terminals is narrow, it is possible to obtain high reliability in the electric connection portion between the recording element substrate and the electric wiring substrate.

Figure 1A:
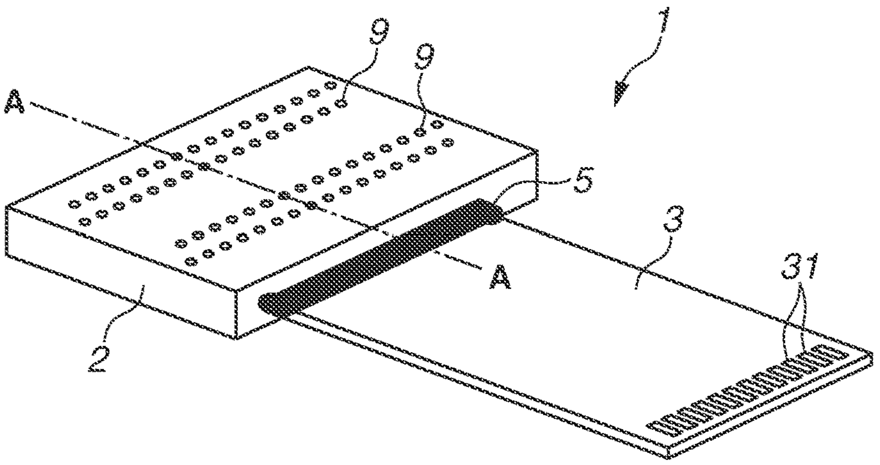
FIGS. 1A to 1C are diagrams each illustrating a liquid ejection head according to a first exemplary embodiment.
Figure 1B:
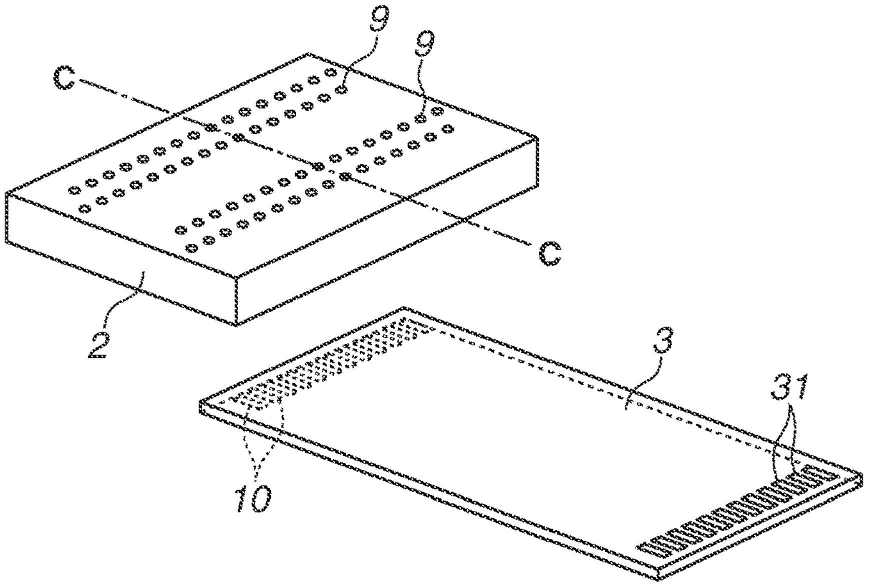
Figure 1C:
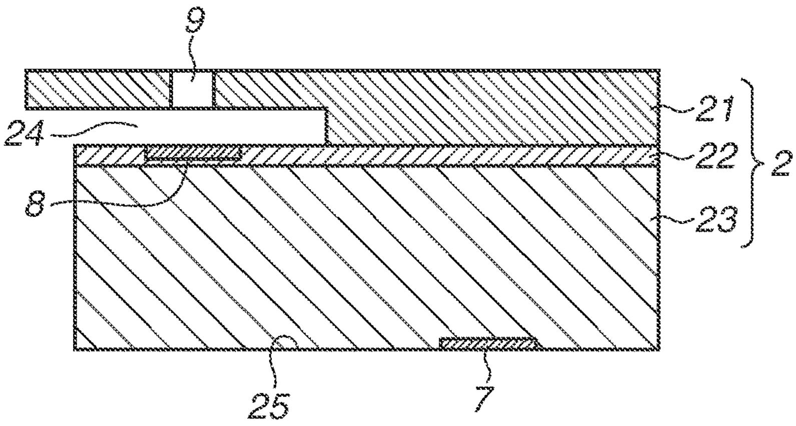
Figure 2A:
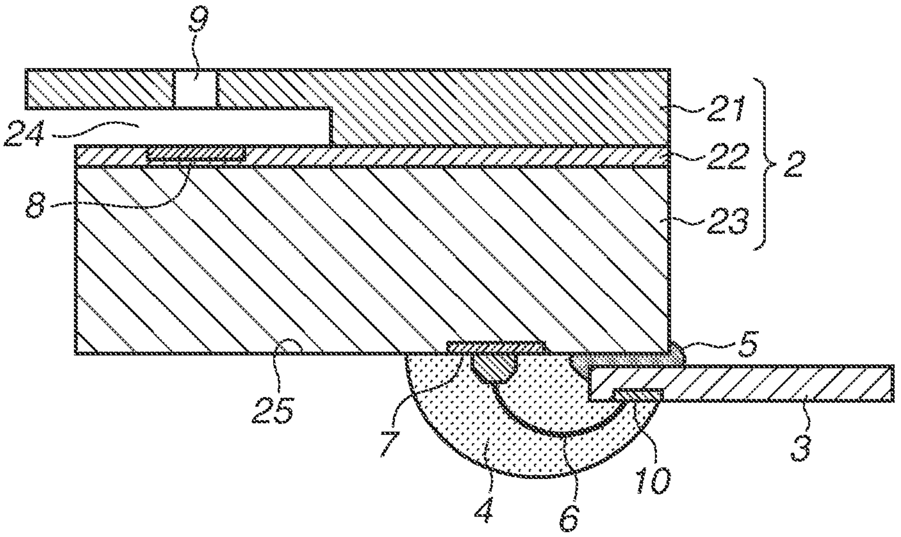
FIGS. 2A and 2B are diagrams for describing an electric connection portion according to the first exemplary embodiment.
Figure 2B:
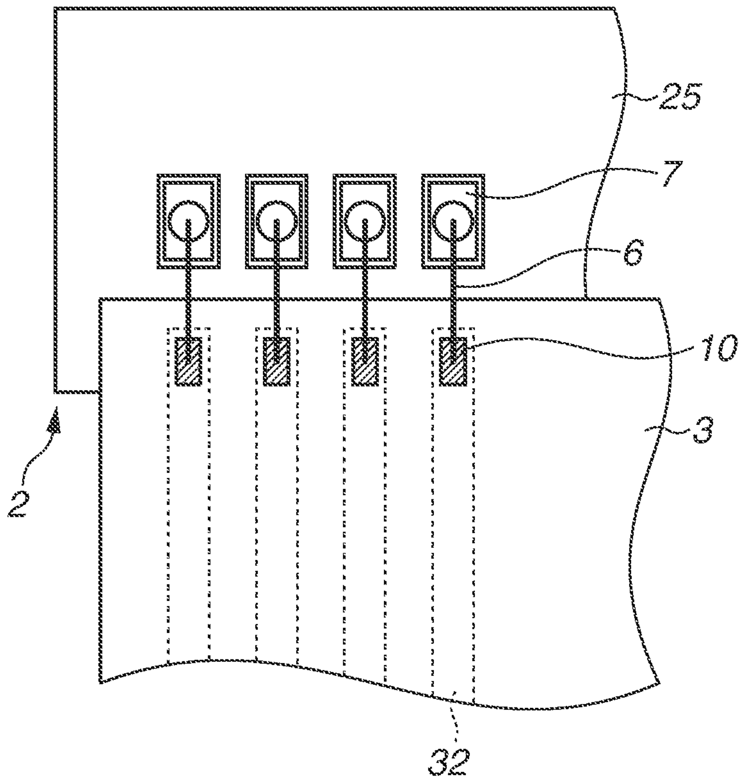

FIGS. 1A to 1C and FIGS. 2A and 2B are diagrams each illustrating a liquid ejection head according to a first exemplary embodiment to which the present disclosure can be applied. FIG. 1A is a perspective view of a liquid ejection head 1. FIG. 1B is an exploded perspective view illustrating the liquid ejection head 1 in a state where a recording element substrate 2 and an electric wiring substrate 3 are separated from each other. FIG. 1C is a sectional view along a C-C-line in FIG. 1B, illustrating a main section of the recording element substrate 2. FIG. 2A is a sectional view along an A-A line in FIG. 1A, illustrating a main section of the liquid ejection head 1 in a state where the electric wiring substrate 3 is connected to the recording element substrate 2. FIG. 2B is a plan view illustrating an electric connection portion between the recording element substrate 2 and the electric wiring substrate 3. For a simplified description, a sealant 4 and an adhesive 5 are not illustrated in FIG. 2B.

The liquid ejection head 1 includes the recording element substrate 2 and the electric wiring substrate 3 that is connected to the recording element substrate 2, as illustrated in FIG. 1A. A plurality of ejection ports 9 that ejects liquid is arrayed on one surface (surface on an upper side in FIG. 1A) of the recording element substrate 2. As illustrated in FIG. 1B, the electric wiring substrate 3 is a long and thin member that is formed of, for example, a flexible printed circuit (FPC) and a tape automated bonding (TAB), and is used for supplying power and signals from the main body of the liquid ejection apparatus, on which the liquid ejection head is mounted, to the recording element substrate 2. At one end portion of the electric wiring substrate 3 in a longitudinal direction (extending direction of wiring inside the electric wiring substrate 3), formed is a plurality of connection regions 10, in which a conductor is exposed in a pad shape, at positions used for connection to electrode terminals 7 of the recording element substrate 2. At the other end portion of the electric wiring substrate 3 in the longitudinal direction, a plurality of connection terminals 31, in which the conductor is exposed in a pad shape, is arranged. The connection regions 10 and the connection terminals 31 are electrically connected to each other on a one-to-one basis by a plurality of conductive patterns 32 (refer to FIG. 2B) formed in a conductive layer inside the electric wiring substrate 3.

The recording element substrate 2 is mainly composed of an energy generating element 8, an ejection port forming member 21 in which the ejection port 9 is formed, a wiring layer 22, and a base portion 23 made of a silicon substrate, as illustrated in FIG. 1C. The ejection port forming member 21 is arranged on one surface of the base portion 23. The electrode terminal 7 is formed on the other surface of the base portion 23, whereby a plurality of electrode terminals 7 is arranged on the other surface of the recording element substrate 2. In the following description, out of a pair of surfaces of the recording element substrate 2, the surface on which the electrode terminals 7 are formed is also referred to as a connection surface 25. In the present exemplary embodiment, the surface of the base portion 23 that is composed of the silicon substrate on the back side of the surface on which the ejection port forming member 21 is arranged constitutes the connection surface 25. A recessed portion is formed on the surface of the ejection port forming member 21 on the base portion 23 side at a position where the ejection port 9 is formed and in the vicinity of the position, and the recessed portion constitutes a pressure chamber 24 that communicates with the ejection port 9. The energy generating element 8 is arranged so as to be capable of applying energy to liquid inside the pressure chamber 24. The wiring layer 22 is configured so as to electrically connect the energy generating element 8 and the electrode terminal 7 to each other. When the energy generating element 8 is the electro-thermal converter, the energy generating element 8 is arranged on one surface of the base portion 23, and the wiring layer 22 is arranged on bonding surfaces between the one surface of the base portion 23 and the ejection port forming member 21. In this case, the wiring layer 22 formed on the one surface of the base portion 23 and the electrode terminal 7 formed on the other surface of the base portion 23 are electrically connected to each other via, for example, a via hole. In contrast, when the energy generating element 8 is a piezoelectric element, the piezoelectric element and the wiring layer 22 are formed, for example, inside the base portion 23, and a vibration plate is arranged between the piezoelectric element and the pressure chamber 24. Note that a circuit including a transistor and an integrated circuit (not illustrated) is arranged between the energy generating element 8 and the electrode terminal 7, and the energy generating element 8 and the electrode terminal 7 may be electrically connected to each other via this circuit.

Connection between the recording element substrate 2 and the electric wiring substrate 3 will now be described. The electrode terminal 7 of the recording element substrate 2 and the connection region 10 of the electric wiring substrate 3 are connected to each other using an electric connection member 6, and the recording element substrate 2 and the electric wiring substrate 3 are thereby electrically connected to each other. The electric connection member 6 is typically a conductive wire for connection (that is, a bonding wire), and bonds each electrode terminal 7 and each connection region 10 using a wire bonding method. In the present exemplary embodiment, the electric connection member 6 is, for example, a gold wire. The electric connection member 6 is not limited to gold wire, and is only required to be any one metal out of gold, copper, aluminum, and silver, or a material that is mainly composed of an alloy containing two or more of these metals. As is well known, in the wire bonding, when the wire for connection and an object to be connected are bonded to each other, it is necessary to apply at least one of heat, pressure, and ultrasonic waves to an interface, that is, a bonded portion between the wire and the object to be connected. Thus, when the wire bonding is performed, the object to be connected needs to be supported in some kind of form. Since the recording element substrate 2 has rigidity in the present exemplary embodiment, placing the recording element substrate 2 on a work table or the like such that the electrode terminal 7 faces upward allows the recording element substrate 2 to be stably supported for the wire bonding. In contrast, the electric wiring substrate 3 is a thin and flexible member, and thus needs to be intentionally supported when the wire bonding is performed. Assuming that a jig is used for supporting the electric wiring substrate 3, there may be a case where a step, which is formed depending on the jig and thicknesses tolerances of the recording element substrate 2 and the electric wiring substrate 3, makes the support for the electric wiring substrate 3 unstable, and pressure and/or ultrasonic waves cannot be applied appropriately. As a result, there is a possibility of a decrease in reliability in electric connection between the recording element substrate 2 and the electric wiring substrate 3. It can be also assumed that the formation of the step is prevented when the wire bonding is performed by attaching a support member that supports the electric wiring substrate 3 to the recording element substrate 2 in advance. However, this case may lead to an increase in cost for components and cost for manufacturing.

To address this, in the liquid ejection head 1 according to the present exemplary embodiment, the electric wiring substrate 3 is supported by the recording element substrate 2 itself when the wire bonding is performed. This can prevent the support from becoming unstable due to the formation of the step or eliminate the necessity of an additional supporting member. That is, as illustrated in FIGS. 2A and 2B, in the liquid ejection head 1 according to the present exemplary embodiment, one end portion of the electric wiring substrate 3 is arranged separately from the electrode terminal 7 on the other surface of the recording element substrate 2, that is, the surface on which the electrode terminal 7 is formed. The connection region 10 in which electric connection to the connection region 10 is established is arranged at one end portion of the electric wiring substrate 3, and is positioned above the other surface of the recording element substrate 2. The whole of the electric connection portion between the recording element substrate 2 and the electric wiring substrate 3 is sealed with the sealant 4 and thereby protected. The whole of the electric connection portion includes the electrode terminal 7 of the recording element substrate 2 and the connection region 10 of the electric wiring substrate 3. The sealant 4 preferably has rigidity to protect the electric connection portion from external force and a function of preventing corrosion due to liquid for ejection, moisture in the circumference, and the like. Thus, a material, such as an epoxy resin, is preferably used for the sealant 4, but a preferable material can be used for the sealant 4 in accordance with performance required for the sealant 4. In the illustrated example, the one end portion of the electric wiring substrate 3 is fixed to the other surface of the recording element substrate 2, that is, the connection surface 25, with the adhesive 5.

A procedure of connecting the electric wiring substrate 3 to the recording element substrate 2 will now be described. When the recording element substrate 2 is completed in the process of manufacturing the liquid ejection head 1, the recording element substrate 2 is supported such that the connection surface 25, that is, the surface on which the electrode terminals 7 are arranged, faces upward. As one example, the recording element substrate 2 is placed on a fixed plane of the work table, or the like. Subsequently, the one end portion of the electric wiring substrate 3 is arranged above the connection surface 25 of the recording element substrate 2 separately from the electrode terminal 7 so that the connection region 10 is positioned above the connection surface 25. At this time, it is possible not to fix the electric wiring substrate 3 to the recording element substrate 2. However, it is preferable that the electric wiring substrate 3 be fixed to the recording element substrate 2 using a material, such as the adhesive 5 and an adhesive sheet, which stabilizes positioning between the electric wiring substrate 3 and the recording element substrate 2, and enables electric connection with high reliability. Instead of using the adhesive 5 or the adhesive sheet, any method can be used that enables fixing of a position of the one end portion of the electric wiring substrate 3. Subsequently, the electrode terminal 7 and the connection region 10 of the electric wiring substrate 3 are electrically connected to each other with the electric connection member 6. Thereafter, the electric connection portion including the electrode terminal 7, the electric connection member 6, and the connection region 10 is covered with the sealant 4 and protected. With this process, the liquid ejection head 1 illustrated in FIG. 1A is completed.

In the present exemplary embodiment, the electrode terminal 7 and the electric wiring substrate 3 are connected to each other with the electric connection member 6 by using the wire bonding. When the wire boding is performed, a bonding tool is used to apply heat, pressure, ultrasonic waves, and/or the like while the electric connection member 6 is brought into contact with the electrode terminal 7 and the connection region 10. As a result, one end of the electric connection member 6 comes in contact with the electrode terminal 7, the other end thereof comes in contact with the connection region 10, and electric connection between the electrode terminal 7 and the connection region 10 is thereby completed. Since a bonding region in the electrode terminal 7 is on the connection surface 25 of the recording element substrate 2 placed on the work table, that is, on a flat upper surface, and the recording element substrate 2 is a member with high rigidity, it is possible to efficiently transmit heat, pressure, ultrasonic waves, and/or the like to the interface between the electric connection member 6 and the electrode terminal 7. This enables stable bonding between the electrode terminal 7 and the electric connection member 6. Furthermore, since the connection region 10 of the electric wiring substrate 3 is also arranged above the connection surface 25 of the recording element substrate 2, it is similarly possible to efficiently transmit heat, pressure, ultrasonic waves, and/or the like, serving as a condition necessary for stable wire bonding, to the interface between the electric connection member 6 and the connection region 10. This enables stable bonding between the connection region 10 and the electric connection member 6. As a result, the present exemplary embodiment enables establishment of highly reliable electric connection between the recording element substrate 2 and the electric wiring substrate 3 without using a jig nor providing an additional support member, and thereby enables obtaining of the liquid ejection head 1 with high reliability in electrical connection. In comparison with the technique discussed in U.S. Pat. No. 9,950,511 or other techniques, the present exemplary embodiment can shorten a length of the electric connection member 6 itself, which is a bonding wire. This can reduce power loss, make the liquid ejection head 1 less susceptible to noise, and prevent a defect in transmission of signals. In addition, a shortened length of the electric connection member 6, which is, for example, a gold wire, reduces an amount of use of the gold wire, and can thereby reduce cost of components.

Figure 3A:
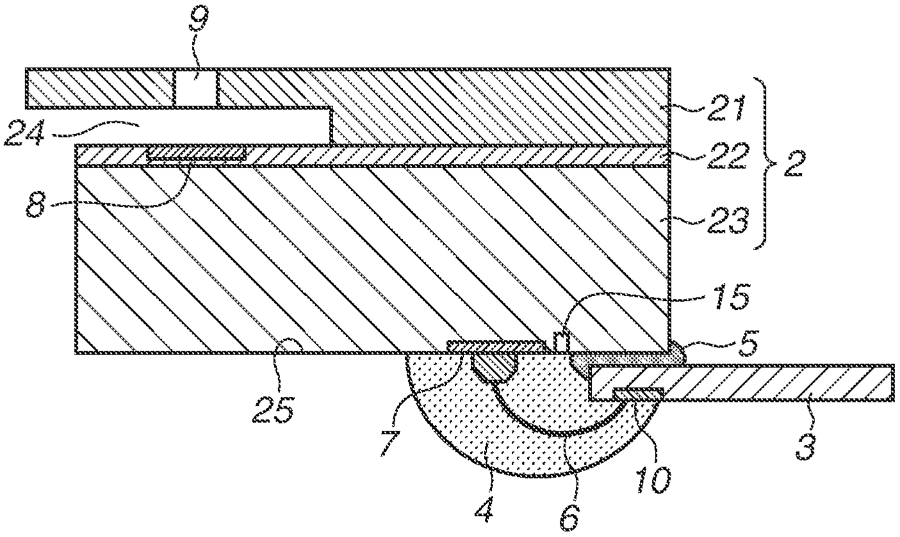
FIGS. 3A and 3B are diagrams for describing an electric connection portion according to a second exemplary embodiment.
Figure 3B:
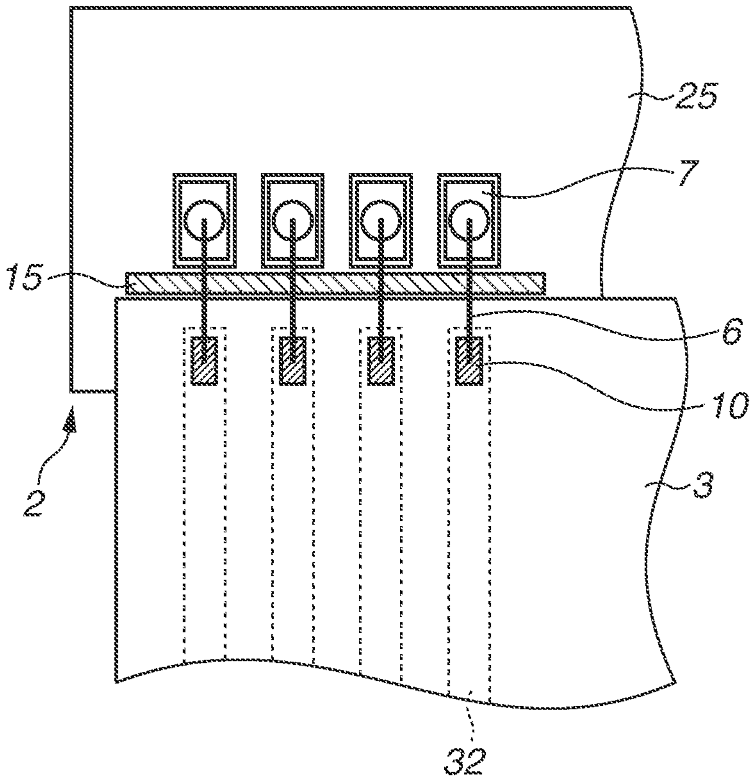

FIGS. 3A and 3B each illustrate the liquid ejection head 1 according to a second exemplary embodiment. FIG. 3A is a sectional view similar to FIG. 2A, illustrating a main section of the liquid ejection head 1 in a state where the electric wiring substrate 3 is connected to the recording element substrate 2. FIG. 3B is a plan view similar to FIG. 2B, illustrating the electric connection portion between the recording element substrate 2 and the electric wiring substrate 3. In these drawings, a constituent element that is similar to that in the first exemplary embodiment is denoted by a reference sign identical to that in the first exemplary embodiment, and an overlapping description of the constituent element is not repeated below. As described in the first exemplary embodiment, fixing one end portion of the electric wiring substrate 3 to the connection surface 25 of the recording element substrate 2 with the adhesive 5 or the like stabilizes the position of the electric wiring substrate 3, and enables execution of stable wire bonding. However, in a case where an interval between the leading end at one end portion of the electric wiring substrate 3 and the electrode terminal 7 is small or an application quantity of the adhesive 5 is large, there may be a case where the adhesive 5 protrudes toward the electrode terminal 7 side and adheres to the electrode terminal 7 when the electric wiring substrate 3 is fixed to the connection surface 25 with the adhesive 5. There is a possibility that adherence of the adhesive 5 to the electrode terminal 7 causes an adverse effect on the wire bonding and decreases reliability of electric connection. In the liquid ejection head 1 according to the second exemplary embodiment, a groove portion 15 is preliminarily formed between a position at which the leading end at one end portion of the electric wiring substrate 3 is arranged and the electrode terminal 7 in the connection surface 25 of the recording element substrate 2. The formation of the groove portion 15 in the connection surface 25 causes an excessive adhesive, which protrudes when the electric wiring substrate 3 is bonded and fixed to the recording element substrate 2, to be caught by the groove portion 15, and can thereby prevent the adhesive 5 from protruding toward the electrode terminal 7. While the illustrated groove portion 15 is formed as one row of a linear groove, the shape of the groove portion 15 or the number of groove portions 15 to be arranged can be changed as appropriate depending on a protruding state of the adhesive 5. For example, the groove portion 15 can be arranged in a U-shape in the connection surface 25 of the recording element substrate 2. Alternatively, a plurality of divided grooves may constitute the groove portion 15.

Figure 4A:
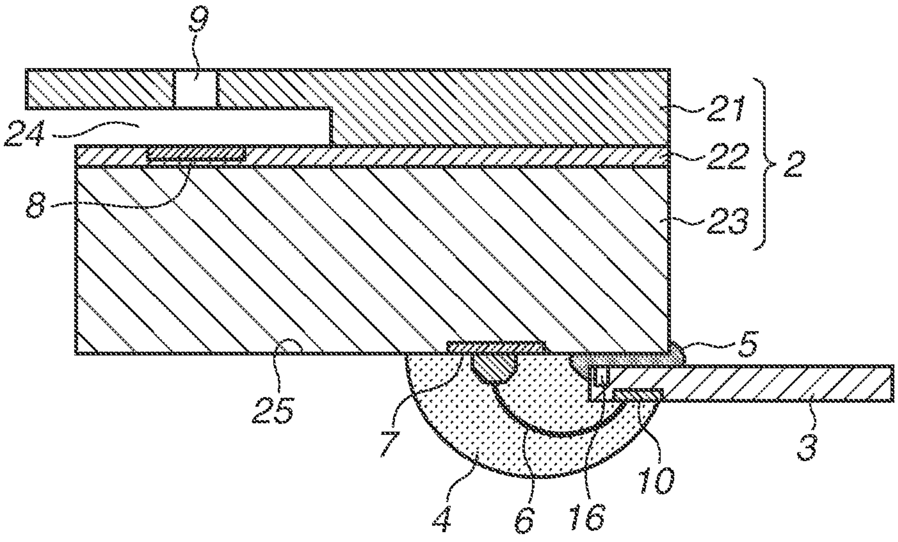
FIGS. 4A and 4B are diagrams for describing an electric connection portion according to a third exemplary embodiment.
Figure 4B:
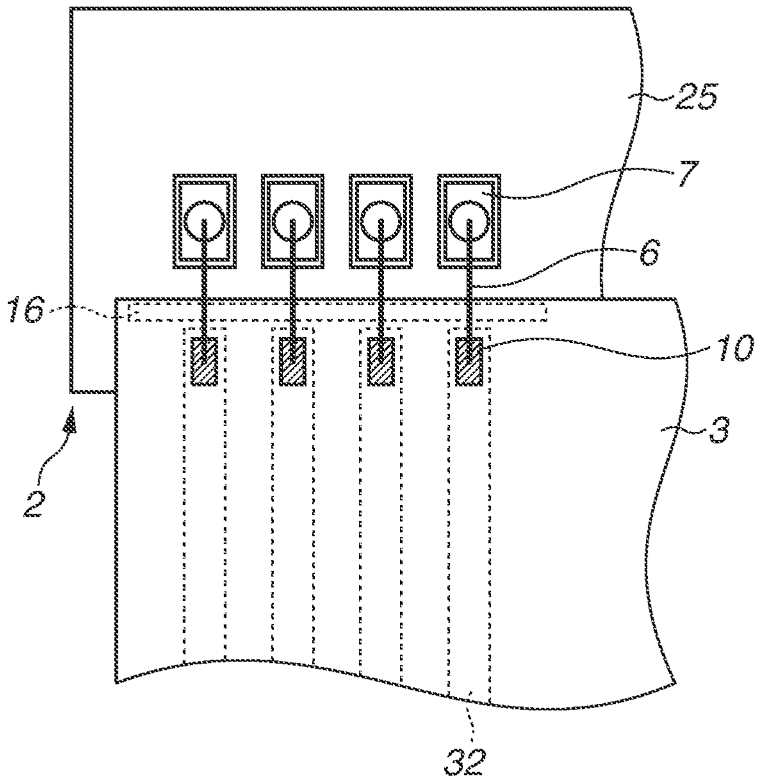

FIGS. 4A and 4B each illustrate the liquid ejection head 1 according to a third exemplary embodiment. FIG. 4A is a sectional view similar to FIG. 2A, illustrating a main section of the liquid ejection head 1 in a state where the electric wiring substrate 3 is connected to the recording element substrate 2. FIG. 4B is a plan view similar to FIG. 2B, illustrating the electric connection portion between the recording element substrate 2 and the electric wiring substrate 3. While the formation of the groove portion 15 in the connection surface 25 of the recording element substrate 2 prevents the adhesive 5 from protruding toward the electrode terminal 7 side in the second exemplary embodiment, formation of a groove portion 16 in the surface of the electric wiring substrate 3 facing the recording element substrate 2 prevents the adhesive 5 from protruding in the third exemplary embodiment. The groove portion 16 formed in the electric wiring substrate 3 is arranged, at one end portion of the electric wiring substrate 3, between a leading end at the one end portion and a position where the connection region 10 is formed. The arrangement of such a groove portion 16 in the electric wiring substrate 3 prevents the adhesive 5 from protruding toward the electrode terminal 7, and can also prevent the adhesive 5 from crawling upward to the connection region 10 of the electric wiring substrate 3. The present exemplary embodiment can prevent adhesion of the adhesive 5 to both members regarding electric connection, that is, the electrode terminal 7 and the connection region 10, and enables stable wire bonding. While the illustrated groove portion 16 is formed as one row of a linear groove, the shape of the groove portion 16 or the number of the groove portions 15 can be changed as appropriate depending on a protrusion state of the adhesive 5. For example, the groove portion 16 can be arranged in a U-shape in the surface of the electric wiring substrate 3. Alternatively, a plurality of divided grooves may constitute the groove portion 16.

Figure 5A:
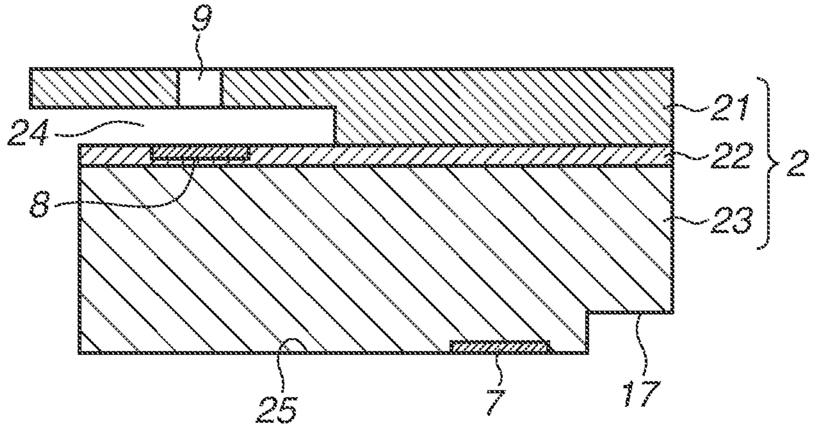
FIGS. 5A and 5B are diagrams for describing an electric connection portion according to a fourth exemplary embodiment.
Figure 5B:
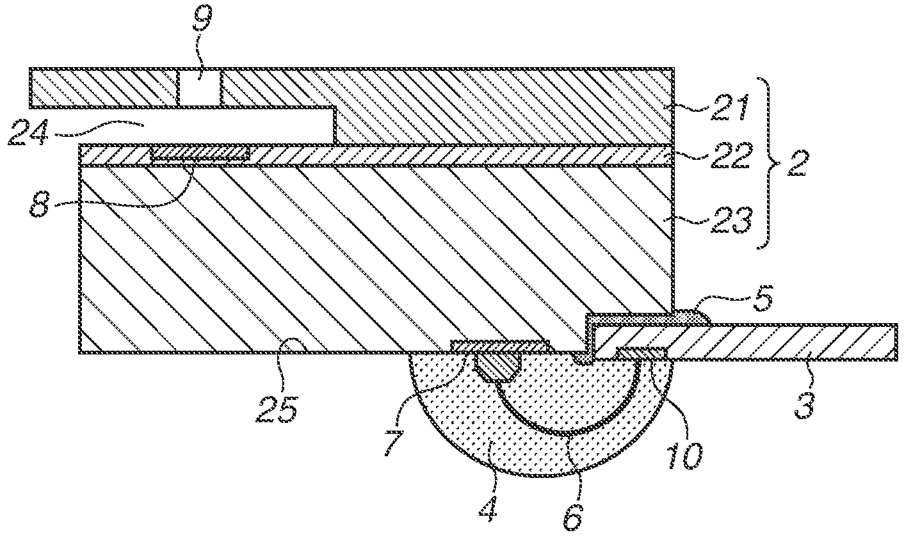

FIGS. 5A and 5B each illustrate the liquid ejection head 1 according to a fourth exemplary embodiment. FIG. 5A is a sectional view similar to FIG. 1C, illustrating a main section of the recording element substrate 2. FIG. 5B is a sectional view similar to FIG. 2A, illustrating a main section of the liquid ejection head 1 in a state where the electric wiring substrate 3 is connected to the recording element substrate 2. The liquid ejection head 1 according to the fourth exemplary embodiment is similar to the liquid ejection head 1 according to the first exemplary embodiment, but is different in that a surface 17 on which a step is formed between the surface 17 and the connection surface 25 of the recording element substrate 2 is formed and one end portion of the electric wiring substrate 3 is bonded and fixed to the surface 17. The surface 17 is a bottom surface of a recessed portion constituting the step formed on the connection surface 25, and one end portion of the electric wiring substrate 3 is accepted by and arranged in the recessed portion. The step is formed by cutting part of the base portion 23 constituting the recording element substrate 2. With the arrangement of the surface 17 on which the step is formed, assuming that a position at which the electrode terminal 7 is arranged on the connection surface 25 of the recording element substrate 2 serves as a reference, one end portion of the electric wiring substrate 3 is arranged at a position that is lower than the position at which the electrode terminal 7 is arranged on the connection surface 25. Forming the step and arranging the electric wiring substrate 3 on the surface 17 formed by the step on a lower side can prevent the adhesive 5 from protruding toward the electrode terminal 7 side. Furthermore, since the electric wiring substrate 3 has two bonding surfaces with respect to the recording element substrate 2 and adhesion force thereby increases, the electric wiring substrate 3 is more strongly fixed to the recording element substrate 2, thereby enabling stable wire bonding.

Figure 6A:
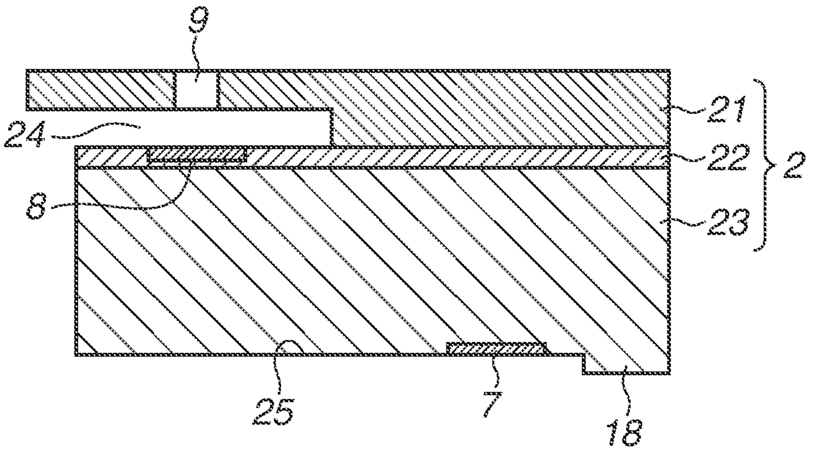
FIGS. 6A and 6B are diagrams for describing an electric connection portion according to a fifth exemplary embodiment.
Figure 6B:
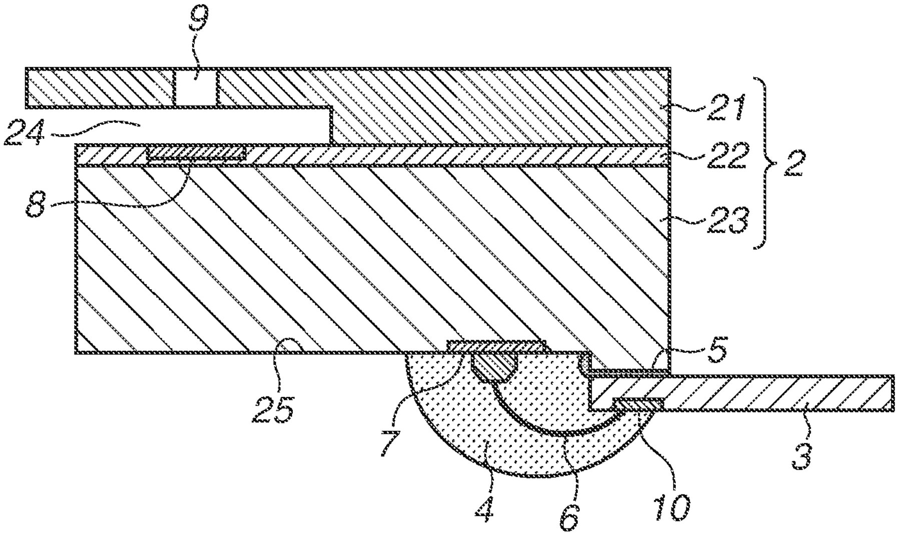

FIGS. 6A and 6B each illustrate the liquid ejection head 1 according to a fifth exemplary embodiment. FIG. 6A is a sectional view similar to FIG. 1C, illustrating a main section of the recording element substrate 2. FIG. 6B is a sectional view similar to FIG. 2A, illustrating a main section of the liquid ejection head 1 in a state where the electric wiring substrate 3 is connected to the recording element substrate 2. The liquid ejection head 1 according to the fifth exemplary embodiment is similar to the liquid ejection head 1 according to the first exemplary embodiment, but is different in that a protrusion portion 18 whose top surface is a plane is arranged on the connection surface 25 of the recording element substrate 2, and one end portion of the electric wiring substrate 3 is bonded and fixed to the top surface of the protrusion portion 18. Assuming that the position at which the electrode terminal 7 is arranged on the connection surface 25 of the recording element substrate 2 serves as a reference, one end portion of the electric wiring substrate 3 is arranged at a position that is higher than the position at which the electrode terminal 7 is arranged on the connection surface 25. Since bonding and fixing one end portion of the electric wiring substrate 3 to the protrusion portion 18 elongates a distance from the bonded portion to the electrode terminal 7, the present exemplary embodiment can also prevent the adhesive 5 from protruding toward the electrode terminal 7 side.

Figure 7:
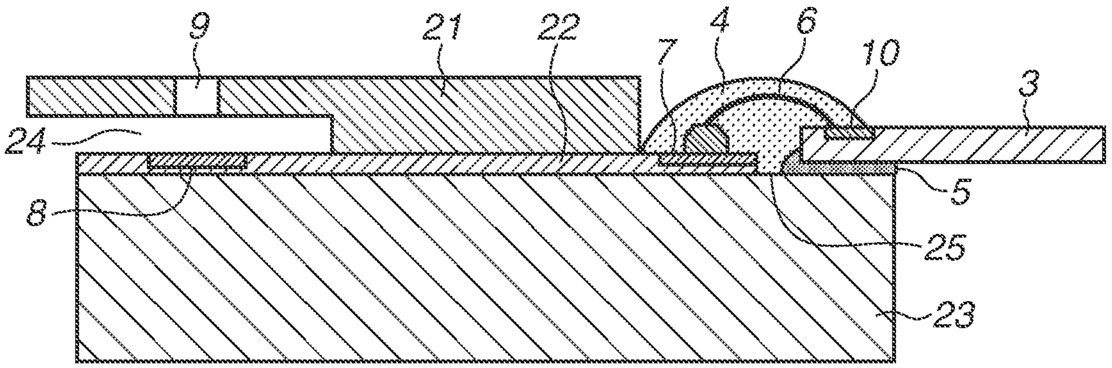
FIG. 7 is a diagram for describing an electric connection portion according to a sixth exemplary embodiment.

FIG. 7 is a diagram illustrating the liquid ejection head 1 according to a sixth exemplary embodiment. FIG. 7 is a sectional view similar to FIG. 2A, illustrating a main section of the liquid ejection head 1 in a state where the electric wiring substrate 3 is connected to the recording element substrate 2. In the liquid ejection head 1 according to the first to fifth exemplary embodiments, the surface of the recording element substrate 2 on which the electrode terminal 7 is formed, that is, the connection surface 25, is the surface on the opposite side of the surface on which the ejection port 9 is formed, but the present disclosure is not limited thereto. The electrode terminal 7 can be arranged on the surface of the recording element substrate 2 on which the ejection port 9 is formed, and this surface can serve as the connection surface 25. The liquid ejection head 1 according to the sixth exemplary embodiment illustrated in FIG. 7 corresponds to the liquid ejection head 1 according to the first exemplary embodiment in which the electrode terminal 7 is formed on the surface of the recording element substrate 2 on which the ejection port 9 is formed. The connection region 10 of the electric wiring substrate 3 is connected to the electrode terminal 7 by wire bonding using the electric connection member 6. In this configuration, the energy generating element 8 serves as the electro-thermal converter, and the energy generating element 8 and the wiring layer 22 that is connected to the energy generating element 8 are formed on one surface of the base portion 23. On one surface of the base portion 23, a region in which the ejection port forming member 21 is not laminated is arranged. The wiring layer 22 is extended to this region, and this region serves as the electrode terminal 7. The electric wiring substrate 3 is separated from the electrode terminal 7, and one end portion of the electric wiring substrate 3 is fixed to one surface of the base portion 23 with the adhesive 5. At this time, the connection region 10 of the electric wiring substrate 3 is located above the one surface of the base portion 23. The electrode terminal 7 and the connection region 10 are electrically connected to each other via wire bonding using the electric connection member 6. This electric connection portion is sealed with the sealant 4. In a case where the structure according to the present exemplary embodiment is applied to the thermal-system liquid ejection head in which the energy generating element 8 is arranged on, out of the pair of surfaces of the base portion 23, one surface on which the ejection port forming member 21 is formed, there is an advantage in that the structure eliminates the need for forming a via hole or the like in the base portion 23.

Figure 8:
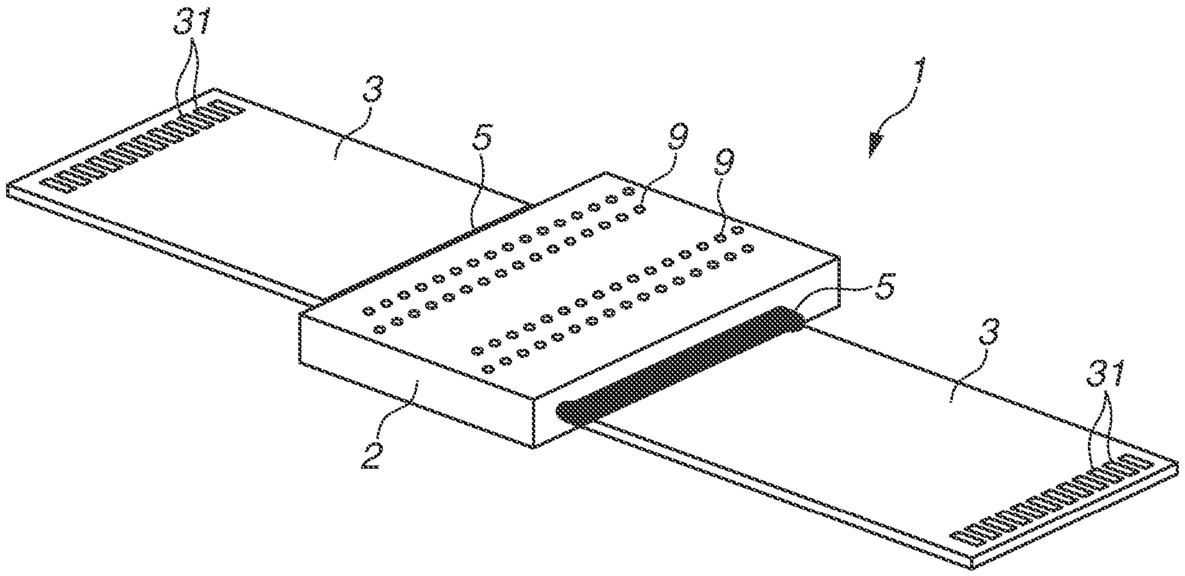
FIG. 8 is a diagram for describing a liquid ejection head according to a seventh exemplary embodiment.

FIG. 8 is a perspective view illustrating the liquid ejection head 1 according to a seventh exemplary embodiment. When the number of ejection ports 9 increases and the number of energy generating elements 8 also increases in the liquid ejection head 1, the number of electrode terminals 7 also needs to be increased. Also when a driving current to be supplied to the recording element substrate 2 is large or the number of signals is large, the number of electrode terminals 7 is increased. It is difficult to narrow a pitch between the electrode terminals 7 by a predetermined amount or larger. Thus, in such a case, arranging the electrode terminal 7 on each side of the recording element substrate 2 in the longitudinal direction can be assumed. In this case, two rows of the electrode terminals 7 are arranged, and thus the electric wiring substrate 3 is prepared for each row of the electrode terminal 7, and the electrode terminal 7 and the electric wiring substrate 3 are electrically connected to each other. As a result, two electric wiring substrates 3 are connected to the recording element substrate 2 in the liquid ejection head 1 as illustrated in FIG. 8, and these two electric wiring substrates 3 extend in mutually opposite directions across the recording element substrate 2. Even with such a configuration, the configurations described in the first to sixth exemplary embodiments can be applied to electric connection between the electrode terminal 7 of the recording element substrate 2 and the connection region 10 of the electric wiring substrate 3. In the above-mentioned example, when two rows of the electrode terminals 7 are formed, each row of the electrode terminal 7 is formed along each of a pair of long sides of the recording element substrate 2. However, the arrangement of the rows of the electrode terminals 7 is not limited thereto, and three or more rows of the electrode terminals 7 can be arranged. The row of the electrode terminal 7 is arranged along a freely-selected side of the recording element substrate 2, the electric wiring substrate 3 is arranged for each row, and the electric wiring substrate 3 and the corresponding row of the electrode terminal 7 can be electrically connected to each other. That is, a plurality of rows of the electrode terminals 7 is arranged on the connection surface 25 of one recording element substrate 2, and the electric wiring substrate 3 may be connected to each row of the electrode terminal 7.

The exemplary embodiments of the present disclosure to which the present disclosure can be applied have been described. In recent years, a liquid ejection technique or an ink-jet recording technique has been applied to a medium other than a paper medium, such as a printed circuit board. While a liquid ejection head that is used for such application and a liquid ejection apparatus on which the liquid ejection head is mounted are demanded to have high reliability as industrial equipment, the liquid ejection head according to the present disclosure can satisfy such demand for reliability. The liquid ejection head according to the present disclosure realizes configuration of a liquid ejection recording apparatus capable of maintaining high recording quality even at the time of high-speed recording.

The liquid ejection head according to the present disclosure can perform recording by ejecting various kinds of liquid other than ink used for ink-jet recording. Using the liquid ejection head according to the present disclosure makes it possible to perform various kinds of processing (e.g., recording, work, application, and irradiation) on various kinds of media. The media subjected to the processing include a so-called recording medium, and various kinds of media to which liquid can be added regardless of whether or not the media have a sheet shape, such as paper, plastics, a film, a cloth, a metal, and a flexible substrate.

The present disclosure enables obtaining of the liquid ejection head that secures reliability in the electric connection portion between the recording element substrate and the electric wiring substrate.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-164257, filed Oct. 5, 2021, which is hereby incorporated by reference herein in its entirety.

What is claimed is:

1. A liquid ejection head, comprising:

a recording element substrate including:

an ejection port configured to eject liquid;

an energy generating element configured to generate energy for ejecting the liquid from the ejection port;

an electrode terminal that is electrically connected to the energy generating element;

an ejection port forming member in which the ejection port is formed; and a silicon substrate; and an electric wiring substrate that is electrically connected to the electrode terminal, wherein the electrode terminal is disposed on a connection surface of the recording element substrate, and wherein a connection region, in which electric connection to the electrode terminal is established, is arranged at an end portion of the electric wiring substrate, and the end portion of the electric wiring substrate is disposed above a surface of the recording element substrate on a connection surface side and is separated from the electrode terminal, and wherein the end portion of the electric wiring substrate is disposed above a surface of the silicon substrate on which the ejection port forming member is arranged.

2. The liquid ejection head according to claim 1, wherein the electrode terminal and the connection region are electrically connected to each other by an electric connection member, one end of the electric connection member being bonded to the electrode terminal, the other end of the electric connection member being bonded to the connection region.

3. The liquid ejection head according to claim 2, wherein the electric connection member is a bonding wire.

4. The liquid ejection head according to claim 2, wherein an electric connection portion between the recording element substrate and the electric wiring substrate is sealed with a sealant, the electric connection portion including the electrode terminal, the connection region, and the electric connection member.

5. The liquid ejection head according to claim 1, wherein the end portion of the electric wiring substrate is fixed to the surface of the recording element substrate on the connection surface side with an adhesive.

6. The liquid ejection head according to claim 1, wherein the end portion of the electric wiring substrate is disposed above the connection surface.

7. The liquid ejection head according to claim 6, wherein on the connection surface, a groove portion is formed between the electrode terminal and a region in which the electric wiring substrate is disposed.

8. The liquid ejection head according to claim 1, wherein a groove portion is formed at a position between a position corresponding to the connection region and a leading end of the end portion, on a surface of the electric wiring substrate facing the recording element substrate at the end portion.

9. The liquid ejection head according to claim 1, wherein the recording element substrate has a recessed portion on the surface on the connection surface side, and the end portion of the electric wiring substrate is disposed on a surface that is a bottom surface of the recessed portion.

10. The liquid ejection head according to claim 1, wherein a protrusion portion is formed on the connection surface, and the end portion of the electric wiring substrate is disposed on a top surface of the protrusion portion.

11. The liquid ejection head according to claim 1, wherein a plurality of rows of the electrode terminal is disposed on the connection surface of the recording element substrate, and the electric wiring substrate is connected to each row of the electrode terminal.

12. A liquid ejection head, comprising:

a recording element substrate including:

an ejection port configured to eject liquid;

an energy generating element configured to generate energy for ejecting the liquid from the ejection port;

an electrode terminal that is electrically connected to the energy generating element;

an ejection port forming member in which the ejection port is formed; and a silicon substrate; and an electric wiring substrate that is electrically connected to the electrode terminal, wherein the electrode terminal is disposed on a connection surface of the recording element substrate, and wherein a connection region, in which electric connection to the electrode terminal is established, is arranged at an end portion of the electric wiring substrate, and the end portion of the electric wiring substrate is disposed above a surface of the recording element substrate on a connection surface side and is separated from the electrode terminal, wherein the end portion of the electric wiring substrate is disposed above a surface of the silicon substrate, and wherein the end portion of the electric wiring substrate is disposed above a back side of the surface of the silicon substrate on which the ejection port forming member is arranged.

* * * * *